(12) United States Patent
Li et al.

(10) Patent No.: US 11,353,162 B1
(45) Date of Patent: Jun. 7, 2022

(54) UNMANNED AERIAL VEHICLE (UAV)-BASED INTELLIGENT ANOMALY IDENTIFICATION METHOD FOR PETROLEUM PIPELINE INSPECTION

(71) Applicant: Chengdu Univerisity of Technology, Chengdu (CN)

(72) Inventors: Qiong Li, Chengdu (CN); Lin Yue, Chengdu (CN); Yu Zhang, Chengdu (CN); Jianjun He, Chengdu (CN)

(73) Assignee: CHENGDU UNIVERSITY OF TECHNOLOGY, Chengdu (CN)

( * ) Notice: Subject to any disclaimer, the term of this patent is extended or adjusted under 35 U.S.C. 154(b) by 0 days.

(21) Appl. No.: 17/453,651

(22) Filed: Nov. 5, 2021

(30) Foreign Application Priority Data

May 6, 2021 (CN) .......................... 202110488160.5

(51) Int. Cl.
| | |
|---|---|
| *G01V 3/165* | (2006.01) |
| *F17D 5/00* | (2006.01) |
| *G06T 7/00* | (2017.01) |
| *H04N 7/18* | (2006.01) |
| *H04N 5/232* | (2006.01) |
| *G06T 7/73* | (2017.01) |

(Continued)

(52) U.S. Cl.
CPC .............. *F17D 5/00* (2013.01); *B64C 39/024* (2013.01); *G05D 1/101* (2013.01); *G06T 7/0004* (2013.01);

(Continued)

(58) Field of Classification Search
CPC ... F17D 5/00; B64C 39/024; B64C 2201/127; G05D 1/101; G06T 7/0004; G06T 7/60;

(Continued)

(56) References Cited

U.S. PATENT DOCUMENTS

| | | | |
|---|---|---|---|
| 2006/0215901 A1* | 9/2006 | Nakagaki ................ | G06T 7/001 382/149 |
| 2007/0201739 A1* | 8/2007 | Nakagaki .............. | G06T 7/0006 382/149 |

(Continued)

FOREIGN PATENT DOCUMENTS

| | | |
|---|---|---|
| CN | 110823899 A | 2/2020 |
| CN | 111814721 A | 10/2020 |

(Continued)

OTHER PUBLICATIONS

Li Qi-Yu, et al., Application of UAV Remote Sensing in Oil and Gas Pipeline Inspection, Infrared, 2014, pp. 37-42, vol. 35, No. 3.

(Continued)

*Primary Examiner* — Howard D Brown, Jr.
(74) *Attorney, Agent, or Firm* — Bayramoglu Law Offices LLC (57) ABSTRACT

An unmanned aerial vehicle (UAV)-based intelligent anomaly identification method for petroleum pipeline inspection is provided. The precise UAV cruise technology is combined with a target detection algorithm to design an intelligent petroleum pipeline inspection method, which realizes fast anomaly detection for petroleum pipeline inspection based on the existing computer processing capability. In addition, a lot of optimization algorithms and improvements are made for target detection under special working conditions of UAV inspection, and a dedicated target detection network model adapted to these conditions is trained. The UAV-based intelligent anomaly identification method realizes accurate, real-time anomaly reporting for petroleum pipeline inspection, reduces the blindness of manual inspection, greatly improves inspection efficiency, reduces labor costs, and has practicability.

8 Claims, 3 Drawing Sheets

(51) Int. Cl.
  *G06T 7/60* (2017.01)
  *G05D 1/10* (2006.01)
  *B64C 39/02* (2006.01)

(52) U.S. Cl.
  CPC .................. *G06T 7/60* (2013.01); *G06T 7/73* (2017.01); *H04N 5/23299* (2018.08); *H04N 7/185* (2013.01); *B64C 2201/127* (2013.01); *G06T 2207/10016* (2013.01); *G06T 2207/10032* (2013.01); *G06T 2207/20081* (2013.01); *G06T 2207/20084* (2013.01); *G06T 2207/30184* (2013.01)

(58) Field of Classification Search
  CPC ............. G06T 7/73; G06T 2207/10016; G06T 2207/10032; G06T 2207/20081; G06T 2207/20084; G06T 2207/30184; H04N 5/23299; H04N 7/185
  See application file for complete search history.

(56) References Cited

U.S. PATENT DOCUMENTS

| | | | | |
|---|---|---|---|---|
| 2016/0358745 | A1* | 12/2016 | Katou | H01J 37/222 |
| 2016/0364989 | A1* | 12/2016 | Speasl | G08G 5/0034 |
| 2018/0032042 | A1* | 2/2018 | Turpin | G06V 20/17 |
| 2018/0244387 | A1* | 8/2018 | Russell | G08G 5/0069 |
| 2019/0364387 | A1* | 11/2019 | Mian | B64C 39/024 |
| 2020/0393593 | A1* | 12/2020 | Qian | G06K 9/6256 |
| 2022/0083987 | A1* | 3/2022 | Bhunia | G06Q 10/20 |

FOREIGN PATENT DOCUMENTS

| | | |
|---|---|---|
| CN | 112101088 A | 12/2020 |
| IN | 2020041042208 A | 10/2020 |
| WO | 2020068784 A1 | 4/2020 |

OTHER PUBLICATIONS

San Kim, et al., Fault Diagnosis of Power Transmission Lines Using a UAV-Mounted Smart Inspection System, IEEE Access, 2020, pp. 149999-150009, vol. 8.

Shihao Qian, Research on foreign matter detection technology of transmission line based on image processing and design of power line inspection management system, Nanjing University of Science & Technology, 2019, pp. 1-79.

* cited by examiner

UNMANNED AERIAL VEHICLE (UAV)-BASED INTELLIGENT ANOMALY IDENTIFICATION METHOD FOR PETROLEUM PIPELINE INSPECTION

CROSS REFERENCE TO THE RELATED APPLICATIONS

This application is based upon and claims priority to Chinese Patent Applications No. 202110488160.5, filed on May 6, 2021, the entire contents of which are incorporated herein by reference.

TECHNICAL FIELD

The present invention belongs to the technical field of intelligent unmanned aerial vehicle (UAV) inspection, and more particularly, relates to a UAV-based intelligent anomaly identification method for petroleum pipeline inspection.

BACKGROUND

In China, the distribution of oil and natural gas resources is extremely mismatched with population distribution. In the eastern coastal areas of China, oil and natural gas resources are mainly transported by petroleum pipelines. Petroleum pipelines are the main means of transporting oil and natural gas. At present, China's petroleum pipelines are under rapid construction. The existing large-size petroleum pipelines have a total length of 35000 kilometers. It is expected that in the next 10 years, China will realize the entire pipeline transportation of gasoline, diesel, kerosene and other refined oil products. The petroleum pipelines are widely distributed, but the terrains along the petroleum pipelines are complex, which brings great difficulties to pipeline maintenance and inspection.

Traditional petroleum pipeline inspection is implemented by workers on foot along the pipeline, which is low in efficiency, high in labor costs, hard to operate and risky. The wide range and complex environment of long-distance petroleum pipelines greatly limit the acquisition of data by handheld terminals, resulting in high labor costs and difficult operations.

In recent years, with the development of UAV technology, UAVs are used for pipeline inspection, which has become an innovative measure to improve inspection quality and efficiency in the context of refined management. UAVs can acquire high-quality continuous pipeline data from a complex terrain, which provides fundamental support for UAVs to conduct petroleum pipeline inspection.

Meanwhile, the development of computer vision technology and the Internet of Things (IoT) technology provides software support for the realization of UAV-based intelligent petroleum pipeline inspection. The current hottest you only look once (YOLO) target detection technology can realize real-time target detection and rendering of videos. By combining a series of technologies such as anomaly location, valid anomaly filtering, anomaly type definition, intelligent cloud task dispatching platform and others, the accuracy, speed and quality of UAV inspection can be improved for industrial applications. In this way, an integrated system platform for intelligent UAV inspection and task dispatching can be realized, so as to optimize the allocation of equipment resources and human resources and minimize operating costs.

SUMMARY

In order to solve the problems of difficult operation and high labor cost of the existing manual inspection technology of petroleum pipelines, an objective of the present invention is to propose a UAV-based intelligent anomaly identification method for petroleum pipeline inspection.

The present invention adopts the following technical solution: a UAV-based intelligent anomaly identification method for petroleum pipeline inspection, including the following steps:

S1: obtaining a petroleum pipeline anomaly identification network model through training;

S2: setting an inspection route of a UAV according to coordinates of a petroleum pipeline, setting an inspection height and a camera angle of the UAV according to a terrain, correcting a video shooting angle in real time according to a camera attitude, controlling the UAV to inspect according to the inspection route, and transmitting a video shot during a single inspection back to a computer;

S3: performing global anomaly detection, through the petroleum pipeline anomaly identification network model, on the video transmitted back to the computer, and generating a frame number, a type, a pixel size and pixel coordinates of each anomalous point;

S4: determining a dynamic real-time pixel scale based on geographic coordinates, a shooting height and a shooting direction of the UAV;

S5: calculating geographic coordinates of an anomalous point according to the real-time pixel scale and the pixel coordinates of the anomalous point, and filtering out an anomalous point beyond a valid area on two sides of the petroleum pipeline according to geographic coordinates of each anomalous point;

S6: calculating an actual size of the anomalous point according to the pixel size of the anomalous point and the real-time pixel scale, and filtering out an anomalous point having an actual size beyond a standard size range;

S7: filtering out a false anomalous point of suddenly appearing or disappearing through multi-frame joint result verification according to a continuity of video shooting;

S8: de-duplicating an identical anomalous point of repeatedly appearing on a plurality of frames to obtain an anomaly result according to the continuity of the video shooting; and S9: uploading a frame number, a type, a pixel size, geographic coordinates and an image of the anomaly result to an intelligent task dispatching platform to guide an inspection worker to work.

Further, step S1 may include the following sub-steps:

S11: defining an anomaly, and obtaining an anomaly image dataset by shooting perpendicularly through the UAV in an overhead view direction according to a type, an amount and an actual size range of the anomaly;

S12: adding a label drawn through LabelImg in a format of you only look once (YOLO) to an image in the anomaly image dataset to obtain a training dataset; and S13: inputting the training dataset into a YOLOv5 network for target detection and regression training to obtain the petroleum pipeline anomaly identification network model.

Further, step S11 may include the following sub-steps:

S111: defining a vehicle, a person, a building and a natural disaster activity within 20 m on two sides of the petroleum pipeline as the anomaly according to a historical inspection case;

S112: defining the standard size range of the anomaly according to an actual situation; and S113: perpendicularly shooting a plurality of videos through the UAV in the overhead view direction at an identical height from the ground, and intercepting all types of anomaly images from the plurality of videos to construct the anomaly image dataset.

Further, step S2 may include the following sub-steps:

S21: setting the inspection route of the UAV as from pipe point to pipe point according to coordinates of buried pipe points of the petroleum pipeline, and shooting images along the petroleum pipeline;

S22: setting the inspection height of the UAV to be 100 m from the ground according to the terrain;

S23: setting the camera angle of the UAV as an overhead view angle perpendicular to the ground;

S24: adjusting the camera angle in an opposite direction according to a real-time attitude of the UAV when the UAV is turning, accelerating or decelerating, so as to ensure that a camera is always perpendicular to the ground to shoot;

S25: setting the UAV for bilateral cruise or unilateral inspection according to the cruising ability of the UAV; and S26: controlling the UAV to inspect according to the inspection route, and transmitting the video shot during the single inspection back to the computer.

Further, step S3 may include the following sub-steps:

S31: performing global anomaly detection, through the petroleum pipeline anomaly identification network model, on the video transmitted back to the computer, and outputting the frame number, the type, the pixel size and the pixel coordinates of each anomalous point; and S32: expressing the output information in the form of a table and an image, naming the table: video name_global anomaly detection program running time, and naming the image: video name_global anomaly detection program running time_serial number.

Further, step S4 may include the following sub-steps:

S41: obtaining angles $\beta_1$ and $\beta_2$ of rectangular sides of a camera picture, and letting the shooting height of the UAV at the moment t be h(t), the geographic coordinates of the UAV be (X(t),Y(t)) and an image pixel be 1920*1080;

S42: calculating an actual length x(t) and an actual width y(t) corresponding to the camera picture at the moment t according to h(t), $\beta_1$ and $\beta_2$:

$$x(t)=2\tan(\beta_1)/h(t),$$

$$y(t)=2\tan(\beta_2)/h(t);$$

S43: calculating the dynamic real-time pixel scale according to the actual length x(t) and the actual width y(t) as:

$$bx(t)=x(t)/1920,$$

$$by(t)=y(t)/1080,$$

where, bx(t) represents a real-time pixel scale in an x direction, and by(t) represents a real-time pixel scale in a y direction.

Further, step S5 may include the following sub-steps:

S51: letting a camera orientation at the moment t be $P_t$, pixel coordinates of an anomalous point Q be $(x_1,y_1)$ and pixel coordinates of a center point A be (960,540);

S52: calculating an anomalous point vector AQ(t) composed of the anomalous point Q and the center point A according to the pixel coordinates of the anomalous point Q and the real-time pixel scale:

$$AQ(t)=\text{sqrt}[((x_1-960)*bx(t))^2+((y_1-540)*by(t))^2];$$

S53: obtaining an angle $U_t$ between the anomalous point vector AQ(t) and the camera orientation;

S54: calculating an angle Qt between the anomalous point vector AQ(t) and a true north direction according to the camera orientation $P_t$ and the angle $U_t$:

$$Q_t=P_t-360°+U_t;$$

S55: calculating an east-west offset MQ(t) and a north-south offset MA(t) of the anomalous point Q according to the angle $Q_t$:

$$MQ(t)=AQ(t)*\sin(Q_t),$$

$$MA(t)=AQ(t)*\cos(Q_t);$$

S56: calculating geographic coordinates of the anomalous point Q as (X(t)+MQ(t),Y(t)+MA(t)) according to the east-west offset MQ(t) and the north-south offset MA(t); and S57: based on the geographic coordinates of each anomalous point, using an anomalous point within 20 m on two sides of the petroleum pipeline as a valid anomalous point, and filtering out an anomalous point beyond 20 m on two sides of the petroleum pipeline as an invalid anomalous point.

Further, step S6 may include the following sub-steps:

S61: multiplying the pixel size of the anomalous point by the real-time pixel scale to obtain the actual size of the anomalous point; and S62: filtering out the anomalous point having the actual size beyond the standard size range.

Further, step S7 may include the following sub-steps:

S71: traversing frames before and after a certain frame if an anomalous point is detected in the frame; and S72: if the number of frames where an identical anomalous point is detected is greater than 60, determining that the anomalous point is a correct detection result; otherwise, determining that the anomalous point is a false anomalous point of suddenly appearing or disappearing, and filtering out the false anomalous point.

Further, step S8 may include the following sub-steps:

S81: obtaining position coordinates of the identical anomalous point of repeatedly appearing on the plurality of frames, and calculating a median value of all the position coordinates;

S82: filtering out position coordinates having a difference greater than a preset threshold from the median value, and calculating an average value of the remaining position coordinates; and S83: regarding an image with coordinates corresponding to the average value as the anomaly result.

The present invention has the following advantages:

(1) The present invention combines the precise UAV cruise technology with a target detection algorithm to design an intelligent petroleum pipeline inspection method, which realizes fast anomaly detection for petroleum pipeline inspection based on the existing computer processing capability.

(2) The present invention completes target detection through a computer, and compared with traditional manual visual identification methods, the present invention has better continuous detection and global indiscriminate identification capabilities.

(3) The present invention solves the difficulty and high cost of on-site exploration that traditional manual inspection requires, and greatly reduces the maintenance cost and difficulty of petroleum pipeline maintenance.

(4) The present invention makes a lot of optimization algorithms and improvements for target detection under special working conditions of UAV inspection, and trains a dedicated petroleum pipeline anomaly identification network model under these conditions. The present invention realizes real-time anomaly reporting for petroleum pipeline inspection, reduces the blindness of manual inspection, greatly improves inspection efficiency, reduces labor costs, and has practicability.

DETAILED DESCRIPTION OF THE EMBODIMENTS

The exemplary implementations of the present invention are described below with reference to the drawings. It should be understood that the implementations shown in the drawings are merely exemplary, and are intended to illustrate the principle and spirit of the present invention, rather than to limit the scope of the present invention.

Figure 1:
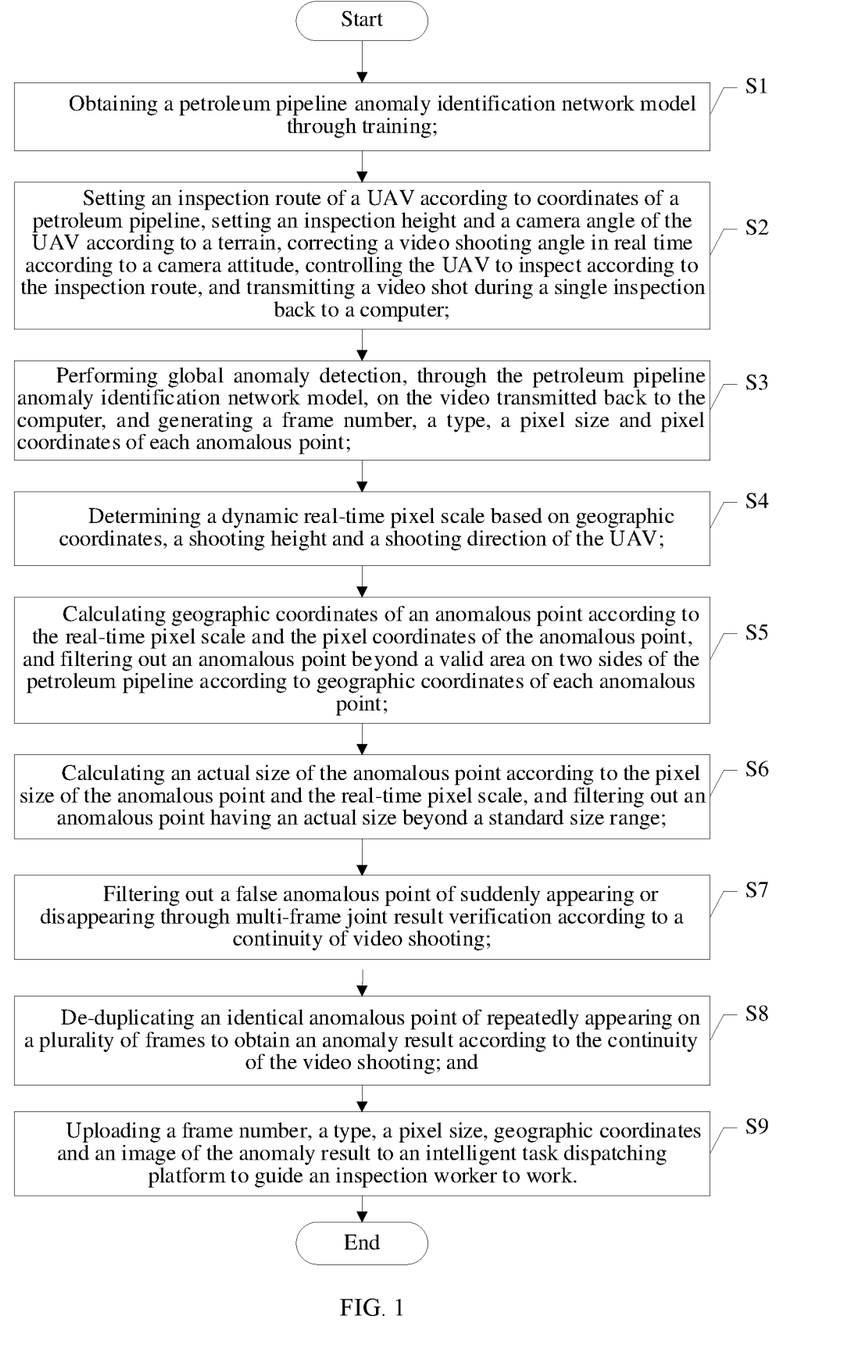
FIG. 1 is a flowchart of a UAV-based intelligent anomaly identification method for petroleum pipeline inspection according to an embodiment of the present invention.

An embodiment of the present invention provides a UAV-based intelligent anomaly identification method for petroleum pipeline inspection. As shown in FIG. 1, the method includes steps S1 to S9.

S1: Obtain a petroleum pipeline anomaly identification network model through raining.

Step S1 includes sub-steps S11 to S13:

S11: Define an anomaly, and obtain an anomaly image dataset by shooting perpendicularly through the UAV in an overhead view direction according to a type, an amount and an actual size range of the anomaly.

In the embodiment of the present invention, a car, a truck, a motorcycle, a building, a water tank, a person and a geological disaster are respectively an anomaly.

Step S11 includes sub-steps S111 to S113:

S111: Define a vehicle, a person, a building and a natural disaster activity within 20 m on two sides of the petroleum pipeline as the anomaly according to a historical inspection case.

S112: Define the standard size range of the anomaly according to an actual situation. For example, the size of a person is <1 m and the size of a car is <5 m for later filtering.

S113: perpendicularly shoot a plurality of videos through the UAV in the overhead view direction at an identical height from the ground, and intercept all types of anomaly images from the plurality of videos to construct the anomaly image dataset.

S12: Add a label drawn through LabelImg in a format of you only look once (YOLO) to an image in the anomaly image dataset to obtain a training dataset.

Figure 2:
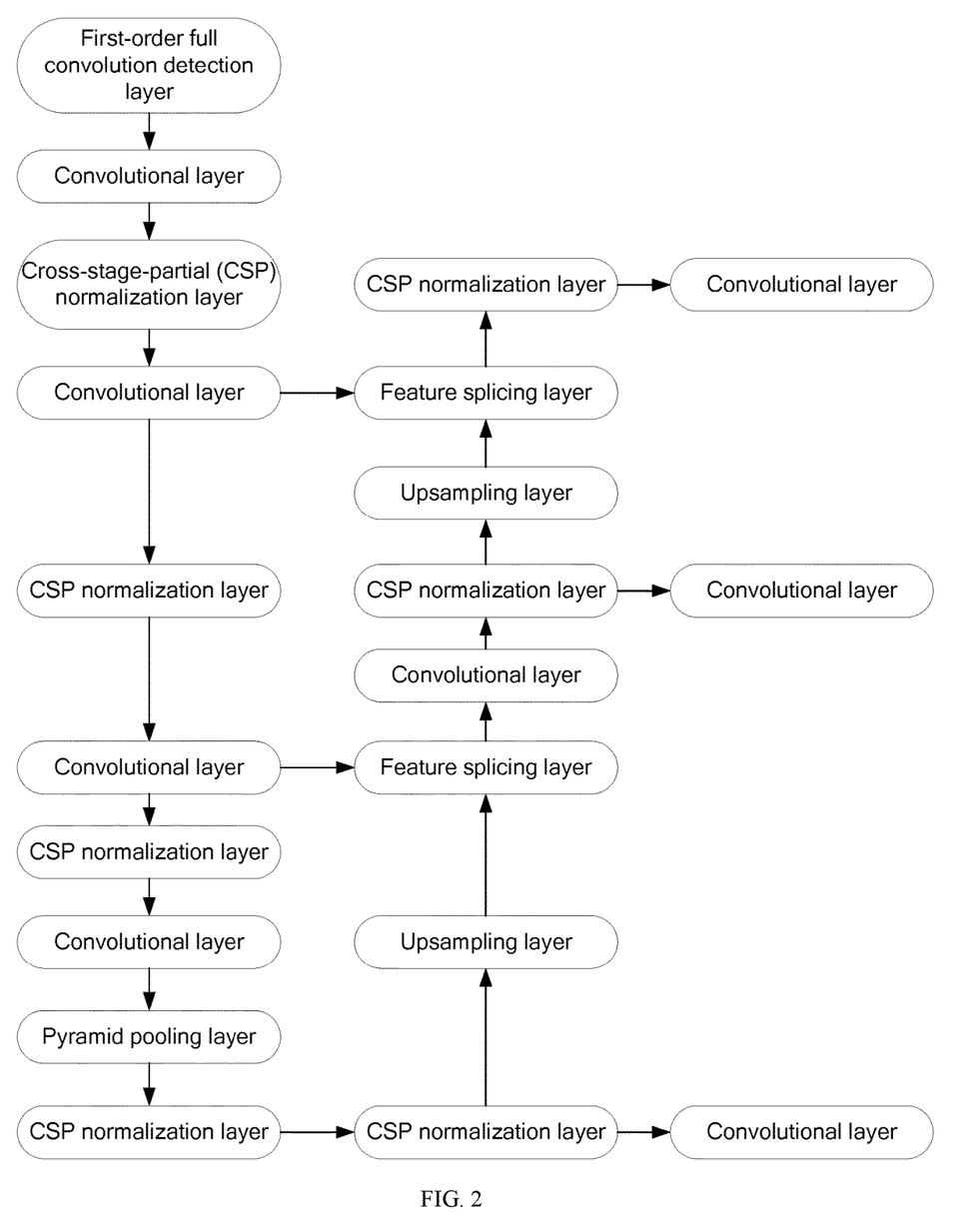
FIG. 2 is a view illustrating a structure of a YOLOv5 network according to an embodiment of the present invention.

S13: Input the training dataset into a YOLOv5 network for target detection and regression training to obtain the petroleum pipeline anomaly identification network model. The structure of the YOLOv5 network is shown in FIG. 2.

In the embodiment of the present invention, the training dataset may be acquired on the petroleum pipeline, or may be acquired over a similar terrain, so as to obtain a larger amount of data more easily. Test images are detected through the petroleum pipeline anomaly identification network model, and detection results output include four elements, namely a frame number (time), a type, a center point location and a pixel size of a target anomaly.

S2: Set an inspection route of a UAV according to coordinates of a petroleum pipeline, set an inspection height and a camera angle of the UAV according to a terrain, correct a video shooting angle in real time according to a camera attitude, control the UAV to inspect according to the inspection route, and transmit a video shot during a single inspection back to a computer.

Step S2 includes sub-steps S21 to S26:

S21: Set the inspection route of the UAV as from pipe point to pipe point according to coordinates of buried pipe points of the petroleum pipeline, and shoot images along the petroleum pipeline. The coordinates of the buried pipe points of the petroleum pipeline are based on existing data, and two pipe points define a straight line.

S22: Set the inspection height of the UAV to be 100 m from the ground according to the terrain.

S23: Set the camera angle of the UAV as an overhead view angle perpendicular to the ground.

S24: Adjust the camera angle in an opposite direction according to a real-time attitude of the UAV when the UAV is turning, accelerating or decelerating, so as to ensure that a camera is always perpendicular to the ground to shoot. The camera is fixed under the UAV. When the UAV is turning, accelerating or decelerating, the camera may not be perpendicular to the ground to shoot, so the video shooting angle needs to be corrected in real time.

S25: Set the UAV for bilateral cruise or unilateral inspection according to the cruising ability of the UAV.

S26: Control the UAV to inspect according to the inspection route, and transmit a video shot during a single inspection back to the computer.

S3: Perform global anomaly detection, through the petroleum pipeline anomaly identification network model, on the video transmitted back to the computer, and generate a frame number, a type, a pixel size and pixel coordinates of each anomalous point.

Step S3 includes sub-steps S31 to S32:

S31: Perform global anomaly detection, through the petroleum pipeline anomaly identification network model, on the video transmitted back to the computer, and output the frame number, the type, the pixel size and the pixel coordinates of each anomalous point. In the embodiment of the present invention, a high-performance intelligent graphics card acceleration algorithm of NVIDIA is required to perform the global anomaly detection on the video transmitted back to the computer.

S32: Express the output information in the form of a table and an image, name the table: video name_global anomaly detection program running time, and name the image: video name_global anomaly detection program running time_serial number.

S4: Determine a dynamic real-time pixel scale based on geographic coordinates, a shooting height and a shooting direction of the UAV.

Step S4 includes sub-steps S41 to S43:

S41: Obtain angles $\beta_1$ and $\beta_2$ (fixed parameters) of rectangular sides of a camera picture, and let the shooting height of the UAV at the moment t be h(t), the geographic coordinates of the UAV be (X(t),Y(t)) and an image pixel be 1920*1080.

S42: Calculate an actual length x(t) and an actual width y(t) corresponding to the camera picture at the moment t according to h(t), $\beta_1$ and $\beta_2$:

$$x(t)=2\tan(\beta_1)/h(t),$$

$$y(t)=2\tan(\beta_2)/h(t);$$

S43: Calculate the dynamic real-time pixel scale according to the actual length x(t) and the actual width y(t) as:

$$bx(t)=x(t)/1920,$$

$$by(t)=y(t)/1080,$$

where, bx(t) represents a real-time pixel scale in an x direction, and by(t) represents a real-time pixel scale in a y direction.

S5: Calculate geographic coordinates of an anomalous point according to the real-time pixel scale and the pixel coordinates of the anomalous point, and filter out an anomalous point beyond a valid area on two sides of the petroleum pipeline according to geographic coordinates of each anomalous point.

Figure 3:
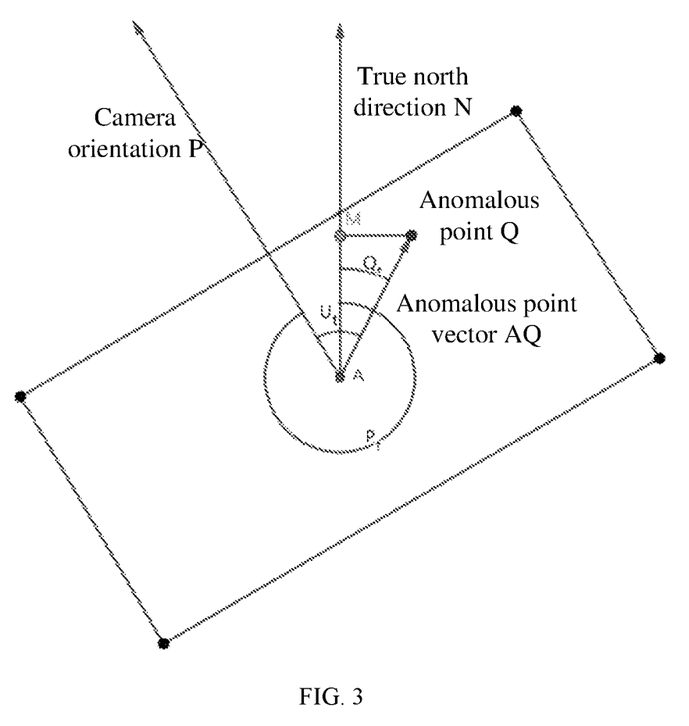
FIG. 3 is a schematic view of anomalous point location according to an embodiment of the present invention.

Step S5 includes sub-steps S51 to S57:

S51: Let camera orientation at the moment t be $P_t$, pixel coordinates of an anomalous point Q be $(x_1, y_1)$ and pixel coordinates of a center point A be (960,540). As shown in FIG. 3, $P_t$ indicates an angle with a true north direction N, which is 0-359°.

S52: Calculate an anomalous point vector AQ(t) composed of the anomalous point Q and the center point A according to the pixel coordinates of the anomalous point Q and the real-time pixel scale:

$$AQ(t)=\mathrm{sqrt}[((x_1-960)*bx(t))^2+((y_1-540)*by(t))^2];$$

S53: Obtain an angle $U_t$ between the anomalous point vector AQ(t) and the camera orientation.

S54: Calculate an angle Qt between the anomalous point vector AQ(t) and the true north direction according to the camera orientation $P_t$ and the angle $U_t$:

$$Q_t=P_t-360°+U_t;$$

S55: Calculate an east-west offset MQ(t) and a north-south offset MA(t) of the anomalous point Q according to the angle $Q_t$:

$$MQ(t)=AQ(t)*\sin(Q_t),$$

$$MA(t)=AQ(t)*\cos(Q_t);$$

S56: Calculate geographic coordinates of the anomalous point Q as (X(t)+MQ(t),Y(t)+MA(t)) according to the east-west offset MQ(t) and the north-south offset MA(t).

S57: Based on the geographic coordinates of each anomalous point, use an anomalous point within 20 m on two sides of the petroleum pipeline as a valid anomalous point, and filter out an anomalous point beyond 20 m on two sides of the petroleum pipeline as an invalid anomalous point. This step can filter out most invalid anomalies, so as to improve the detection accuracy.

S6: Calculate an actual size of the anomalous point according to the pixel size of the anomalous point and the real-time pixel scale, and filter out an anomalous point having an actual size beyond a standard size range.

In reality, objects are usually measured on a size. Therefore, in the embodiment of the present invention, the anomalous points need to be filtered in combination with a standard size range.

Step S6 includes sub-steps S61 to S62:

S61: Multiply the pixel size of the anomalous point by the real-time pixel scale to obtain the actual size of the anomalous point.

S62: Filter out the anomalous point having the actual size beyond the standard size range. This step further improves the detection accuracy.

S7: Filter out a false anomalous point of suddenly appearing or disappearing through multi-frame joint result verification according to a continuity of video shooting.

Since the video is shot continuously, the objects shot (including anomalous points) appear on a plurality of frames of images continuously. Therefore, the same anomalous point will appear in consecutive a plurality of frames during detection, and it will not suddenly appear in a frame and then disappear immediately. It is very likely that an anomalous point appearing only on a single frame or a few frames is a false anomalous point. In addition, according to the flying speed of the UAV, the time for the object to appear in the screen is usually about 5 s.

Based on this, step S7 includes sub-steps S71 to S72:

S71: Traverse frames before and after a certain frame if an anomalous point is detected in the frame.

S72: if the number of frames where an identical anomalous point is detected is greater than 60, determine that the anomalous point is a correct detection result; otherwise, determine that the anomalous point is a false anomalous point of suddenly appearing or disappearing, and filter out the false anomalous point. This step further improves the detection accuracy.

S8: De-duplicate an identical anomalous point of repeatedly appearing on a plurality of frames to obtain an anomaly result according to the continuity of the video shooting.

Since the same anomaly will be detected on a plurality of frames, it is necessary to merge the same anomaly detection results so as to improve the identification accuracy.

Step S8 includes sub-steps S81 to S83:

S81: Obtain position coordinates of the identical anomalous point of repeatedly appearing on the plurality of frames, and calculate a median value of all the position coordinates.

S82: Filter out position coordinates having a difference greater than a preset threshold from the median value, and calculate an average value of the remaining position coordinates.

S83: Regard an image with coordinates corresponding to the average value as the anomaly result.

S9: Upload a frame number, a type, a pixel size, geographic coordinates and an image of the anomaly result to an intelligent task dispatching platform to guide an inspection worker to work.

Those of ordinary skill in the art will understand that the embodiments described herein are intended to help readers understand the principles of the present invention, and it should be understood that the protection scope of the present invention is not limited to such special statements and embodiments. Those of ordinary skill in the art may make other various specific modifications and combinations according to the technical teachings disclosed in the present invention without departing from the essence of the present invention, and such modifications and combinations still fall within the protection scope of the present invention.

What is claimed is:

1. An unmanned aerial vehicle (UAV)-based intelligent anomaly identification method for petroleum pipeline inspection, comprising the following steps:
    S1: obtaining a petroleum pipeline anomaly identification network model through training;
    S2: setting an inspection route of a UAV according to coordinates of a petroleum pipeline, setting an inspection height and a camera angle of the UAV according to a terrain, correcting a video shooting angle in real time according to a camera attitude, controlling the UAV to inspect according to the inspection route, and transmitting a video shot during a single inspection back to a computer;

S3: performing global anomaly detection, through the petroleum pipeline anomaly identification network model, on the video transmitted back to the computer, and generating a frame number, a type, a pixel size and pixel coordinates of each anomalous point;

S4: determining a dynamic real-time pixel scale based on geographic coordinates, a shooting height and a shooting direction of the UAV;

S5: calculating geographic coordinates of an anomalous point according to the dynamic real-time pixel scale and the pixel coordinates of the anomalous point, and filtering out an anomalous point beyond a valid area on two sides of the petroleum pipeline according to geographic coordinates of each anomalous point;

S6: calculating an actual size of the anomalous point according to the pixel size of the anomalous point and the dynamic real-time pixel scale, and filtering out an anomalous point having an actual size beyond a standard size range;

S7: filtering out a false anomalous point of suddenly appearing or disappearing through multi-frame joint result verification according to a continuity of video shooting;

S8: de-duplicating an identical anomalous point of repeatedly appearing on a plurality of frames to obtain an anomaly result according to the continuity of the video shooting; and S9: uploading a frame number, a type, a pixel size, geographic coordinates and an image of the anomaly result to an intelligent task dispatching platform to guide an inspection worker to work;

wherein step S1 comprises the following sub-steps:

S11: defining an anomaly, and obtaining an anomaly image dataset by shooting perpendicularly through the UAV in an overhead view direction according to a type, an amount and an actual size range of the anomaly;

S12: adding a label drawn through LabelImg in a format of you only look once (YOLO) to an image in the anomaly image dataset to obtain a training dataset; and S13: inputting the training dataset into a YOLOv5 network for target detection and regression training to obtain the petroleum pipeline anomaly identification network model;

step S11 comprises the following sub-steps:

S111: defining a vehicle, a person, a building and a natural disaster activity within 20 m on two sides of the petroleum pipeline as the anomaly according to a historical inspection case;

S112: defining the standard size range of the anomaly according to an actual situation; and S113: perpendicularly shooting a plurality of videos through the UAV in the overhead view direction at an identical height from the ground, and intercepting all types of anomaly images from the plurality of videos to construct the anomaly image dataset.

2. The UAV-based intelligent anomaly identification method for the petroleum pipeline inspection according to claim 1, wherein step S2 comprises the following sub-steps:

S21: setting the inspection route of the UAV as from pipe point to pipe point according to coordinates of buried pipe points of the petroleum pipeline, and shooting images along the petroleum pipeline;

S22: setting the inspection height of the UAV to be 100 m from the ground according to the terrain;

S23: setting the camera angle of the UAV as an overhead view angle perpendicular to the ground;

S24: adjusting the camera angle in an opposite direction according to a real-time attitude of the UAV when the UAV is turning, accelerating or decelerating, wherein a camera is ensured to be always perpendicular to the ground to shoot;

S25: setting the UAV for bilateral cruise or unilateral inspection according to a cruising ability of the UAV; and S26: controlling the UAV to inspect according to the inspection route, and transmitting the video shot during the single inspection back to the computer.

3. The UAV-based intelligent anomaly identification method for the petroleum pipeline inspection according to claim 1, wherein step S3 comprises the following sub-steps:

S31: performing the global anomaly detection, through the petroleum pipeline anomaly identification network model, on the video transmitted back to the computer, and outputting the frame number, the type, the pixel size and the pixel coordinates of each anomalous point; and S32: expressing output information in a form of a table and an image, naming the table: video name_global anomaly detection program running time, and naming the image: video name_global anomaly detection program running time_serial number.

4. The UAV-based intelligent anomaly identification method for the petroleum pipeline inspection according to claim 1, wherein step S4 comprises the following sub-steps:

S41: obtaining angles $\beta_1$ and $\beta_2$ of rectangular sides of a camera picture, and letting the shooting height of the UAV at a moment t be h(t), the geographic coordinates of the UAV be (X(t),Y(t)) and an image pixel be 1920*1080;

S42: calculating an actual length x(t) and an actual width y(t) corresponding to the camera picture at the moment t according to h(t), $\beta_1$ and $\beta_2$:

$x(t)=2\tan(\beta_1)/h(t)$, $y(t)=2\tan(\beta_2)/h(t)$;

S43: calculating the dynamic real-time pixel scale according to the actual length x(t) and the actual width y(t) as:

$bx(t)=x(t)/1920$, $by(t)=y(t)/1080$, wherein, bx(t) represents a real-time pixel scale in an x direction, and by(t) represents a real-time pixel scale in a y direction.

5. The UAV-based intelligent anomaly identification method for the petroleum pipeline inspection according to claim 4, wherein step S5 comprises the following sub-steps:

S51: letting a camera orientation at the moment t be $P_t$, pixel coordinates of an anomalous point Q be $(x_1,y_1)$ and pixel coordinates of a center point A be (960,540);

S52: calculating an anomalous point vector AQ(t) composed of the anomalous point Q and the center point A according to the pixel coordinates of the anomalous point Q and the dynamic real-time pixel scale:

$AQ(t)=\text{sqrt}[((x_1-960)*bx(t))^2+((y_1-540)*by(t))^2]$;

S53: obtaining an angle $U_t$ between the anomalous point vector AQ(t) and the camera orientation;

S54: calculating an angle Qt between the anomalous point vector AQ(t) and a true north direction according to the camera orientation $P_t$ and the angle $U_t$:

$Q_t=P_t-360°+U_t$;

S55: calculating an east-west offset MQ(t) and a north-south offset MA(t) of the anomalous point Q according to the angle $Q_t$:

$$MQ(t)=AQ(t)*\sin(Q_t),$$

$$MA(t)=AQ(t)*\cos(Q_t);$$

S56: calculating geographic coordinates of the anomalous point Q as (X(t)+MQ(t),Y(t)+MA(t)) according to the east-west offset MQ(t) and the north-south offset MA(t); and S57: based on the geographic coordinates of each anomalous point, using an anomalous point within 20 m on two sides of the petroleum pipeline as a valid anomalous point, and filtering out an anomalous point beyond 20 m on two sides of the petroleum pipeline as an invalid anomalous point.

6. The UAV-based intelligent anomaly identification method for the petroleum pipeline inspection according to claim 1, wherein step S6 comprises the following sub-steps:

S61: multiplying the pixel size of the anomalous point by the dynamic real-time pixel scale to obtain the actual size of the anomalous point; and S62: filtering out the anomalous point having the actual size beyond the standard size range.

7. The UAV-based intelligent anomaly identification method for the petroleum pipeline inspection according to claim 1, wherein step S7 comprises the following sub-steps:

S71: traversing frames before and after a certain frame when an anomalous point is detected in the frame; and S72: when a number of frames where an identical anomalous point is detected is greater than 60, determining that the anomalous point is a correct detection result; otherwise, determining that the anomalous point is a false anomalous point of suddenly appearing or disappearing, and filtering out the false anomalous point.

8. The UAV-based intelligent anomaly identification method for the petroleum pipeline inspection according to claim 1, wherein step S8 comprises the following sub-steps:

S81: obtaining position coordinates of the identical anomalous point of repeatedly appearing on the plurality of frames, and calculating a median value of all the position coordinates;

S82: filtering out position coordinates having a difference greater than a preset threshold from the median value, and calculating an average value of remaining position coordinates; and S83: regarding an image with coordinates corresponding to the average value as the anomaly result.

* * * * *

UNITED STATES PATENT AND TRADEMARK OFFICE
CERTIFICATE OF CORRECTION

| | |
|---|---|
| PATENT NO. | : 11,353,162 B1 |
| APPLICATION NO. | : 17/453651 |
| DATED | : June 7, 2022 |
| INVENTOR(S) | : Qiong Li et al. |

It is certified that error appears in the above-identified patent and that said Letters Patent is hereby corrected as shown below:

On the Title Page

Item (71) The Applicant name should be:
--Chengdu University of Technology--

Signed and Sealed this
Fifth Day of July, 2022

Katherine Kelly Vidal
Director of the United States Patent and Trademark Office